Figure 1:
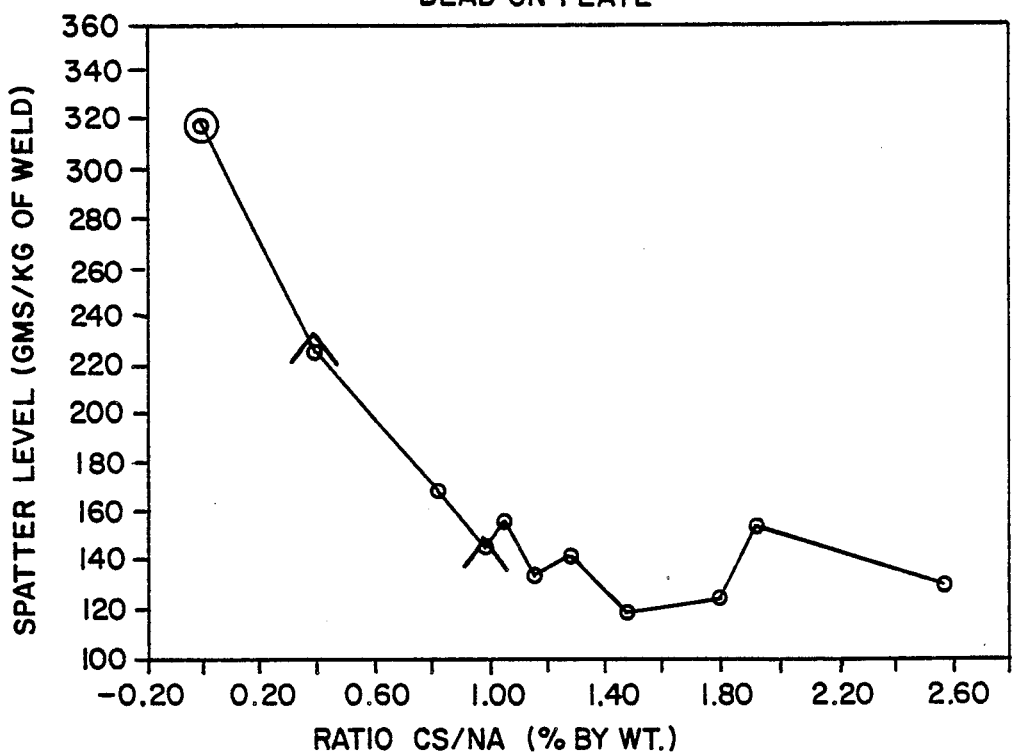

United States Patent [19]

Bushey et al.

[11] Patent Number: 4,999,478
[45] Date of Patent: Mar. 12, 1991

[54] METAL CORED ELECTRODE

[75] Inventors: Roger A. Bushey, Littlestown; Stanley E. Ferree, Hanover, both of Pa.

[73] Assignee: Alloy Rods Global, Inc., Hanover, Pa.

[21] Appl. No.: 425,725

[22] Filed: Oct. 23, 1989

[51] Int. Cl.$^5$ ............................................. B23K 35/22
[52] U.S. Cl. ..................... 219/137 WM; 219/145.22; 219/146.32
[58] Field of Search .................. 219/137 WM, 145.22, 219/146.32, 146.1, 146.22

[56] References Cited

U.S. PATENT DOCUMENTS

| | | |
|---|---|---|
| 2,806,128 | 9/1957 | Muller . |
| 2,932,722 | 4/1960 | Lesnewich . |
| 3,147,362 | 9/1964 | Ramsey et al. . |
| 3,211,883 | 10/1965 | Zimmerman . |
| 3,309,490 | 3/1967 | Cary . |
| 3,513,289 | 5/1970 | Blake et al. . |
| 3,573,426 | 4/1971 | Blake et al. . |
| 4,313,045 | 1/1982 | Agusa et al. . |

OTHER PUBLICATIONS

E. Cushman, "Electrode for Spatter Free Welding of Steel in $CO_2$", Welding Research Supplement, Jan. 1961, pp. 14–21.

B. E. Paton et al., "Gas Shielded Welding with an Activated Consumable Electrode", Automatic Welding, Jan. 1979, pp. 30–35.

N. M. Voropai. "Activated Welding Wires, Their Operational Potential and Application".

*Primary Examiner*—Clifford C. Shaw
*Attorney, Agent, or Firm*—Kirkpatrick & Lockhart

[57] ABSTRACT

A metal cored electrode for $CO_2$ gas shielded welding has 5% to 30% core ingredients in a ferrous metal tube with a seam. The core includes, based upon the weight of the electrode: from about 0.01% to about 0.5% cesium, from about 0.1 to about 3.0 cesium/other alkali metal(s) on a weight basis, the other alkali metals selected from the group consisting of lithium, sodium, potassium and rubidium; and from about 0.3% to about 10% of alloying elements selected from silicon, manganese, and optionally titanium. columbium, aluminum, nickel, chromium and cobalt;

up to 0.01% boron; and balance iron together with incidental impurities;

The electrodes are used in reverse and straight polarity DC and AC $CO_2$ gas shielded welding processes for providing stable arcs and reduced spatter levels as well as high quality weld deposits.

17 Claims, 2 Drawing Sheets

METAL CORED ELECTRODE

This invention relates to a metal cored electrode for $CO_2$ gas shielded metal arc welding, and more particularly to a cesium-containing seamed metal cored electrode for reverse polarity welding.

Relatively expensive inert gases such as argon and helium have long been employed to shield welding arcs from the atmosphere for obtaining high quality welds in reverse polarity as well as straight polarity welding and in A.C. welding processes. The art much prefers reverse polarity welding (where the workpiece is negative) because a negative workpiece is hotter than a positive workpiece which permits better penetration. See, e.g. U.S. Pat. Nos. 2,806,128; 2,932,722 and 3,147,362 and the patents cited therein; and also Cushman, "Electrode for Spatter-Free Welding of Steel in Carbon Dioxide," Welding Research Supplement, January 1961 at pages 14-s to 21-s. As this art discloses in some detail, $CO_2$- containing gases are employed as shielding gases in place of inert gases to reduce the cost of gas shielded welding. Such gases generally include 25% or more $CO_2$ and 75% or less inert gases. However, metal transfer through $CO_2$ shielded arcs tends to be globular in form and to be particularly hard to control in reverse welding processes. This results in unstable arcs and excessive spatter levels which leads to low quality welds, reduced weld efficiency and high clean-up costs.

U.S. Pat. No. 2,932,722 discloses an improved electrode which provides a coating containing so-called emissive agents including cesium (carbonate or hydroxide) in combination with other alkali metals to develop a spray form of metal transfer and thereby to reduce the spatter emissions. However, as disclosed in U.S. Pat. No. 2,932,722, welding with cesium-coated electrodes can only be controlled when operating with straight polarity (where the electrode is negative and the work piece is positive).

U.S. Pat. No. 3,147,362 discloses that the cesium-containing coating of the electrode of U.S. Pat. No. 2,932,722 is so hygroscopic that the cesium compounds tend to break down and that surface films tend to create electrical contact problems. Thus, this patent proposes to provide emissive materials in a fill. The core materials, including metal scraps coated with alkali metal carbonates (comprising less than 1% cesium carbonate and more than 99% rubidium, potassium, sodium and lithium carbonate), are compacted in a metal tube and the filled tube is then extruded and drawn. According to this improvement, the cesium and other highly hygroscopic ingredients in the core are sealed against atmospheric moisture and there are no electrical contact problems experienced of cesium-containing coatings.

The metal cored electrode disclosed by U.S. Pat. No. 3,147,362 has not received commercial acceptance because commercial composite electrodes are preferably not made by filling tubes. Rather, flat metal strips are continuously formed into U-shaped configurations, filled with core ingredients, and then bent into tubes having seams defined by adjacent edges of the strips and finally drawn to size. It is very difficult to continuously and accurately feed cesium containing compounds into such strips because cesium readily absorbs moisture from the atmosphere and then forms clumps which begin to plug the equipment. In addition, moisture from the atmosphere is unavoidably drawn through the seams of composite electrodes into the core, which may then result in high levels of diffusible hydrogen in weld deposits. Desirably, electrodes deposit high quality welds with less than 5ml hydrogen per gram of deposited weld metal (preferably by reverse polarity $CO_2$ gas shielded welding processes) even after having been exposed to moisture for several days while, e.g., laying on a shelf.

The present invention provides a seamed metal cored electrode containing small amounts of cesium and other alkali metals for $CO_2$ gas shielded welding. Spray type metal transfer, stable arcs and reduced spattering are obtained during reversed polarity as well as straight polarity D.C. and A.C. welding not withstanding moisture pickup which inevitably occurs during the fabrication process and later through the seam of the electrode. The ingredients in the core of the metal tube of the electrode comprise, by weight percent of the metal cored electrode, from 0.01% to 0.5% cesium and at least one other alkali metal selected from the group consisting of lithium, sodium, potassium, and rubidium in a weight ratio of from about 0.1 to about 3.0 cesium-/other alkali metal, from about 0.3% to about 0.1% of at least one metallic alloying element, up to about 0.01% of boron and the balance being iron and incidental impurities.

At least about 0.01% cesium is needed to effectively stabilize the welding arc and more than about 0.5% cesium tends to make the welding arc sluggish. Preferably, the electrode contains from 0.07% to 0.2% cesium for obtaining very low spatter levels. The other alkali metal ingredient is preferably comprised mainly of sodium because electrodes embodying the present invention comprising cesium and sodium emissive compounds have significantly improved arc stability and reduced spatter levels in reverse polarity welding processes compared with electrodes embodying the present invention containing potassium or lithium compounds in place of sodium compounds. Most preferably, electrodes of the present invention contain about 0.04% to about 0.17% sodium in addition to the cesium for developing spray metal transfer.

Common metallic alloying elements including 0.2% to 2% silicon, 0.1% to 3% manganese, and optionally up to 0.5% titanium, up to 0.5% columbium, up to 0.5% aluminum, up to 3% nickel, up to 3% chromium and up to 3% cobalt may be present in total amounts of from about 0.3% to about 10% for obtaining the desired properties in the weld deposit. They may be provided as an alloying ingredient or in the cesium source as a inclusion.

The boron may be added as a microalloying ingredient in accordance with the disclosure of U.S. Pat. No. 4,282,420, which is hereby incorporated by reference.

The balance of the core ingredients comprises iron together with incidental impurities, including the type of impurities routinely contained in metals such as carbon, oxygen, nitrogen, sulfur, phosphorous and the like and inclusions normally contained in metal cored electrodes such as the anions and cations with the alkali metals (which are provided in the form of salts).

In a preferred embodiment of the invention, the electrode contains less than about 1% moisture in its core, based upon the weight of the tube and the core materials after exposure to 80% relative humidity at 37° C. (80° F.) for nine days. Electrodes, embodying the present invention, having less than about 1% moisture in their core with the core ingredients, effectively promote stable welding arcs and reduce spatter. Preferably the electrode contains less than about 0.5% moisture, and most preferably, less than 0.3% moisture for depositing quality welds having less than 5 ml hydrogen/gram weld metal deposit, no porosity or other unacceptable defects.

Other details, objects and advantages of the invention including methods of practicing it will become apparent as the following description of presently preferred embodiments thereof proceeds.

Figure 2:
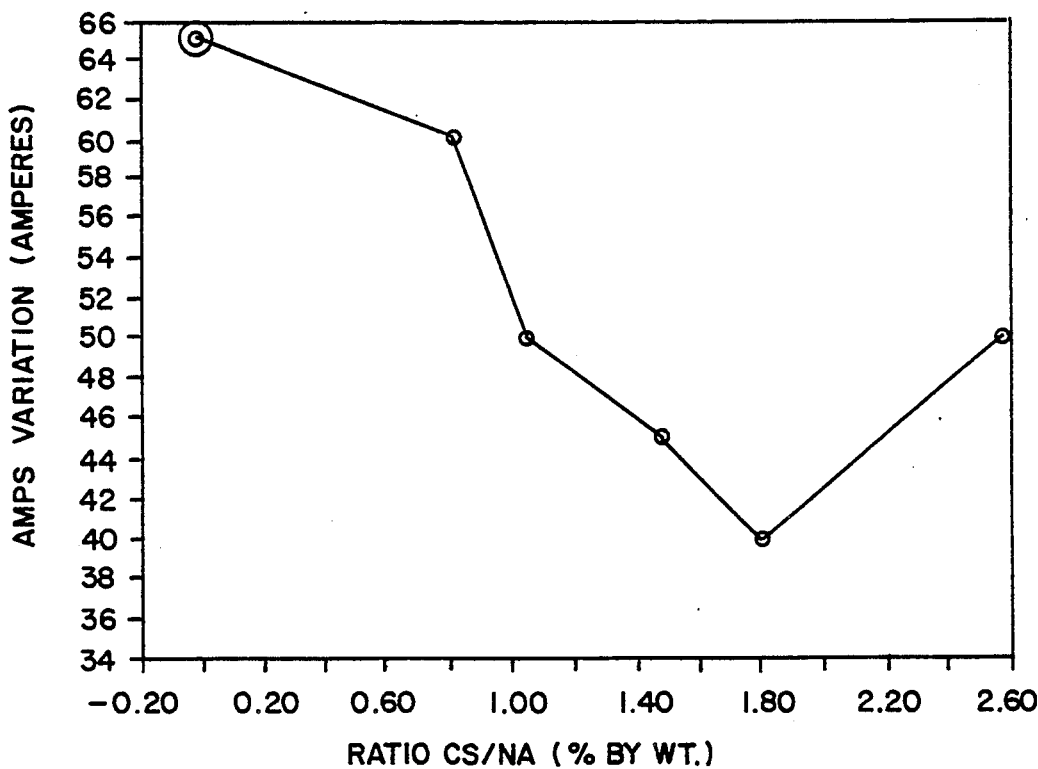
Figure 3:
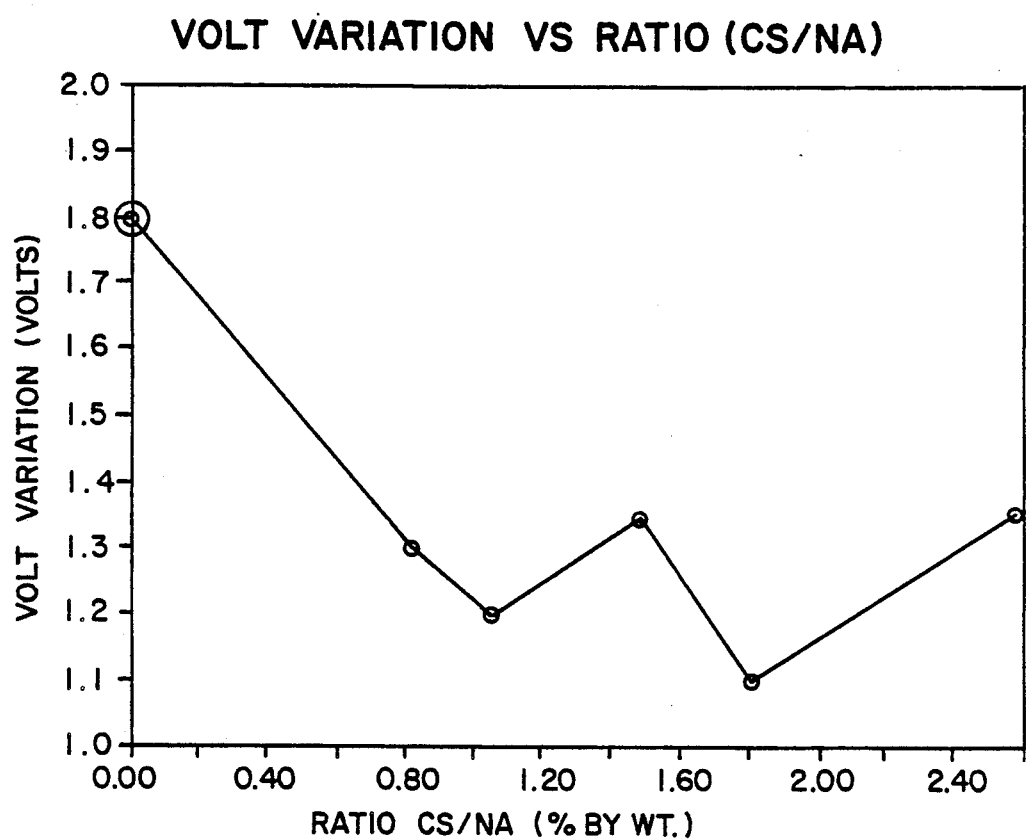

The accompanying drawings present results of comparative tests conducted on electrodes embodying the present invention wherein:

FIG. 1 generally shows the effect of the cesium/alkali metal ratio on spatter levels of welds deposited by a presently preferred electrode;

FIG. 2 generally shows the effect of the cesium/alkali metal ratio on amp variations; and FIG. 3 generally shows the effect of the cesium/alkali metal ratio on voltage variations.

Exemplary electrodes for $CO_2$ gas shielded welding embodying the present invention generally have seamed ferrous metal tubes with core ingredients (based on their weight alone) which include: 0.5% to 1% cesium chromate; 0.5% to 1.5% sodium carbonate; 18% to 26% ferroalloys of silicon, manganese and titanium, in order to provide 0.2% to 2% silicon, 0.1% to 3% manganese and up to 0.5% titanium (based on the electrode weight); and the balance comprising iron powder together with incidental impurities, mainly carbon. The core ingredients normally comprise from about 5% to about 30% of the total electrode weight. The tube which may be from about 1 mm or less up to about 3 mm or more in diameter, may be comprised of carbon, stainless or alloy steel.

Electrodes having seamed 1.2 mm (0.045 inch) diameter mild steel tubes and about 17% of core ingredients present within the above limits were tested against a comparative electrode without cesium-containing salts in a gas shielded reverse polarity welding process using a DC power source at about 260 amps, 29 volt. The shielding gas was nominally 100% $CO_2$. Six inch long welds were deposited in a flat position and the spatter emissions were collected and weighed. The spatter level was then determined per kilogram of weld metal deposited.

FIGS. 1 to 3 generally present the results of the comparative tests. The encircled data point indicates the results of the tests conducted with an electrode which did not contain cesium. FIG. 1 shows that the spatter level was significantly reduced with the addition of 0.4 to 2.6 cesium/sodium. Similarly, FIGS. 2 and 3 show that the amp and voltage variations were also significantly reduced with the addition of small amounts of cesium. These figures also show that there was a dramatic improvement in properties over the comparative electrode by electrodes containing about 0.8 cesium/sodium with perhaps some increase in voltage and amp variation beginning at about 2 weight percent cesium/sodium. Optimum spatter levels were obtained with electrodes comprising 1.2 to weight percent cesium/sodium, which electrodes contained 0.20% cesium/0.17% of sodium and 0.07% cesium/0.04% sodium respectively.

Similar comparative tests conducted on electrodes of this embodiment of the present invention and commercially available electrodes (which do not contain cesium) adapted for $CO_2$ gas shielded welding demonstrated that the electrodes embodying the present invention deposited a flat bead profile in horizontal fillet welds at higher wire speeds and travel speeds than did the comparative commercial electrodes. The commercial electrodes produced arcs that were buried by molten puddle when welding at high wire speeds, which subjects the deposited weld metal to the danger of lack of fusion or slag entrapment.

Cesium and the other alkali metals may be provided in any suitable form in addition to chromate salts. Thus they may be provided as tartrates, permanganates, titanates, aluminates, stearates, carbonates, columbiates, tantalates, zirconates and like compounds, which may also include iron, nickel, chromium, calcium and the like. Cesium chromate is a preferred cesium source. Electrodes containing cesium chromate as a cesium source were exposed to 80% relative humidity/55° C. (130° F.) for 120 hours. Those electrodes deposited high quality welds having n porosity or other detectable defect in a $CO_2$ gas shielded welding test.

Cesium titanate is another preferred cesium source. Leucoxene and other natural titanate sources may advantageously include such metallic alloying elements as chromium and columbium, but also impurities such as calcium and fluorine. Whatever the source of cesium and the other ingredients, electrodes embodying the present invention contain up to 3% chromium, up to 0.5% titanium and up to 0.5% columbium. Preferably, the electrode contains no more than 0.06% titanium and more preferably no more than 0.02% titanium for good spray transfer. Also the electrode preferably contains no more than 0.1% columbium and more preferably no more than 0.05% columbium for good spray transfer. The alkali metals may also be provided as halogen salts, but these salts are not preferred because they are extremely hygroscopic. Thus, they are particularly difficult to transport and feed through weighing equipment while manufacturing electrodes. Such hygroscopic salts may be agglomerated by baking a water glass film on the particles to facilitate their use as alkali metal sources. Preferably, the other alkali metals in addition to cesium includes no more than trace amounts of rubidium which is highly hygroscopic.

In addition to single salts, cesium may be provided as a double salt from natural sources or synthetically. Thus, e.g., cesium aluminum silicate may be provided from pollucite. Alternatively, and more costly, double salts such as cesium aluminum columbiate may be synthesized by sol-gel or other processes. Whatever may be the source of cesium and other ingredients, electrodes embodying the present invention contain no more than 0.5% aluminum, which tends to form refractory aluminum oxides on the metal being transferred. Preferably, the electrodes contain less than 0.1% aluminum for minimizing gobular metal transfer across the welding arc and more preferably less than 0.01% aluminum for obtaining spray transfer across the arc. FIG. 1 includes two data points identified by carets which summarize the results of spatter tests on metal cored electrodes generally similar to the above identified electrodes of the test, but containing cesium in the form of a cesium aluminum columbiate double salt. Thus, FIG. 1 indicates that double salts containing aluminum and other refractory elements such as columbium or tantalum may also be useful sources of cesium in the present invention. However, double salts including halogen salts such as cesium fluorotitanate or the like are not preferred because halogen salts are generally hygroscopic.

The alloying ingredients are preferably provided with the alkali metal-containing compounds and/or as alloys including ferroalloys, but the impurities associated with them should not substantially adversely affect the welding process or the deposited weld metal. The iron is normally in powder form.

Preferably the electrode contains less than about 1% by total electrode weight moisture after exposure to 80° relative humidity at 35° C. (80° F.) for nine days for reducing the effect of moisture upon the cesium during the welding process and the deposited weld metal. More preferably, the electrode contains less than 0.5% moisture for providing an extended shelf life. Electrodes containing less than 0.3% moisture exposed to highly humid atmospheres have produced high quality welds.

Additional $CO_2$ gas shielded welding tests were performed with other electrodes having a 17% fill which had in their cores alloying ingredients including up to 6% silicon, up to 12% manganese and up to 1% titanium, at least about 70% iron and emissive agents in the following amounts (based on the weight of the core ingredients alone):

| Electrode Ingredient | A | B | C | D |
|---|---|---|---|---|
| $Cs_2TiO_3$ | — | — | — | 1.40 |
| $Cs_2CO_3$ | 0.5–1.0 | 0.5–1 | 1.0 | — |
| $Na_2CO_3$ | — | — | 1.25 | 1.25 |
| $K_2CO_3$ | — | 0.4–0.7 | .3 | — |
| $Li_2CO_3$ | 0.5 | — | — | — |

These electrodes had improved arc stability, and reduced spatter levels as well as flatter bead shapes and less roll-over compared with commercially available electrodes not containing cesium.

While certain presently preferred embodiments of the present invention have been described, it is to be distinctly understood that the invention is not limited thereto, but may be variously embodied within the scope of the following claims.

What is claimed is:

1. A metal cored electrode for $CO_2$ gas shielded welding having core ingredients in a ferrous metal tube:
   the metal tube having a seam; and
   the core ingredients including (by weight of the electrode):
   (a) from 0.01% to 0.5% cesium;
   (b) at least one other alkali metal selected from the group consisting of lithium, sodium, potassium and rubidium in a weight ratio of from about 0.1 to about 3.0 cesium/other alkali metal(s);
   (c) from 0.3% to 10% of at least one metallic alloying element selected from the group consisting of
   from 0.2% to 2% silicon,
   from 0.1% to 3% manganese,
   up to 0.5% titanium,
   up to 0.5% columbium,
   up to 0.5% aluminum,
   up to 3% chromium,
   up to 3% nickel, and
   up to 3% cobalt;
   (d) up to 0.01% boron; and (e) the balance iron and incidental impurities.

2. The electrode of claim comprising from 0.07% to 0.2% cesium.

3. The electrode of claim 1, wherein the other at least one alkali metal is selected from the group consisting of sodium, potassium and lithium.

4. The electrode of claim wherein the other alkali metal comprise sodium.

5. The electrode of claim 4, wherein sodium comprises from 0.04% to 0.17%.

6. The electrode of claim 4, comprising a weight ratio of from 0.8 to 2 cesium/sodium.

7. The electrode of claim 4, comprising a weight ratio of from 1.2 to 1.8 cesium/sodium.

8. The electrode of claim wherein the core ingredients comprise less than 1% moisture based upon the weight of the metal cored electrode after exposure to 80% relative humidity at 35° C. (80° F.) for nine days.

9. The electrode of claim wherein the core ingredients comprise less than 0.5% moisture based on the weight of the metal cored electrode after exposure to 80% relative humidity at 35° C. (80° F.) for nine days.

10. The electrode of claim 1, wherein the core ingredients comprise less than 0.3% moisture based on the weight of the metal cored electrode after exposure to 80% relative humidity at 35° C. (80° F.) for nine days.

11. The electrode of claim 1, wherein the cesium is provided as cesium chromate.

12. The electrode of claim 1, wherein the cesium is provided as cesium titanate.

13. The electrode of claim 1, wherein the cesium is provided as cesium carbonate.

14. A $CO_2$ gas shielded welding process comprising the steps of:
   arc welding a workpiece with a metal cored electrode of claim 1;
   providing a gas shield about the arc comprising at least about 25% $CO_2$; and
   applying reverse polarity from a power source whereby the workpiece is negative and the electrode is positive.

15. The process of claim 14, wherein the power is supplied by an AC source.

16. The process of claim 14, wherein the power is applied by a DC source.

17. A $CO_2$ gas shielded welding process comprising the steps of:
   arc welding a workpiece with a metal cored electrode of claim 1;
   providing a gas shield about the arc comprising at least about 25% $CO_2$; and
   applying straight polarity from a power source whereby the workpiece is positive and the electrode is negative.

* * * * *

UNITED STATES PATENT AND TRADEMARK OFFICE
CERTIFICATE OF CORRECTION

PATENT NO. : 4,999,478
DATED : March 12, 1991
INVENTOR(S) : Roger A. Bushey and Stanley E. Ferree It is certified that error appears in the above-identified patent and that said Letters Patent is hereby corrected as shown below:

In the Abstract, first paragraph, last word, delete ";" and substitute --.-- therefor.

Col. 2, line 23, delete "0.1%" and substitute --10%-- therefor.

Col. 3, line 61, delete "1.2 to weight" and substitute --1.2 to 1.8 weight-- therefor.

Col. 4, line 19, delete "n" and substitute --no-- therefor.

Col. 6, line 7, claim 2, after "claim" insert --1--.

Col. 6, line 12, claim 4, after "claim" insert --1--.

Col. 6, line 20, claim 8, after "claim" insert --1--.

Col. 6, line 24, claim 9, after "claim" insert --1--.

Signed and Sealed this

Tenth Day of November, 1992

*Attest:*

DOUGLAS B. COMER

*Attesting Officer*   *Acting Commissioner of Patents and Trademarks*